Dec. 27, 1955   A. A. MUEHLING   2,728,363
ADJUSTABLE TABLE STRUCTURE FOR MACHINE TOOLS
Filed June 1, 1954   3 Sheets-Sheet 1
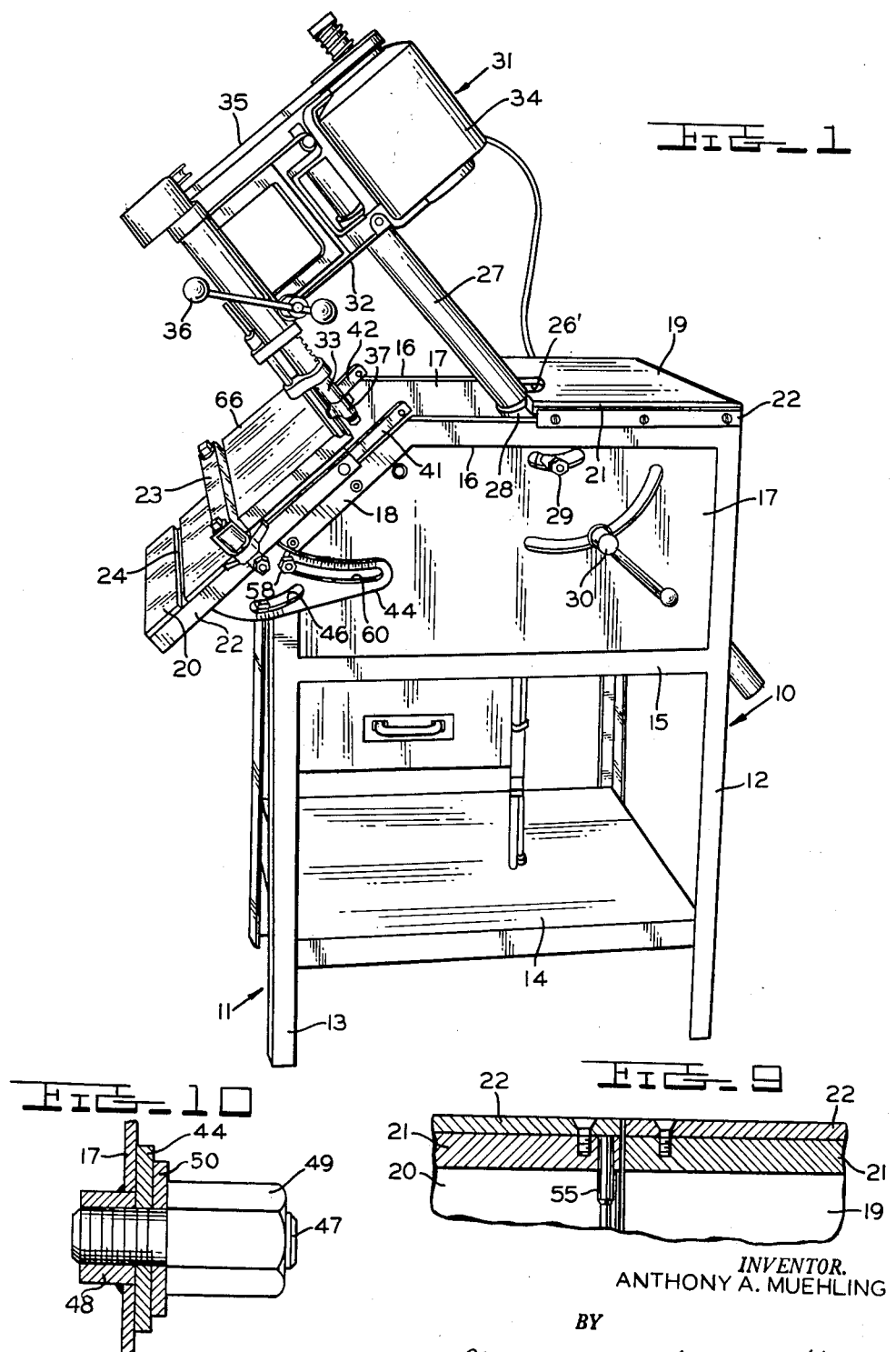
INVENTOR.
ANTHONY A. MUEHLING
BY
Whittemore, Hulbert & Belknap
ATTORNEYS

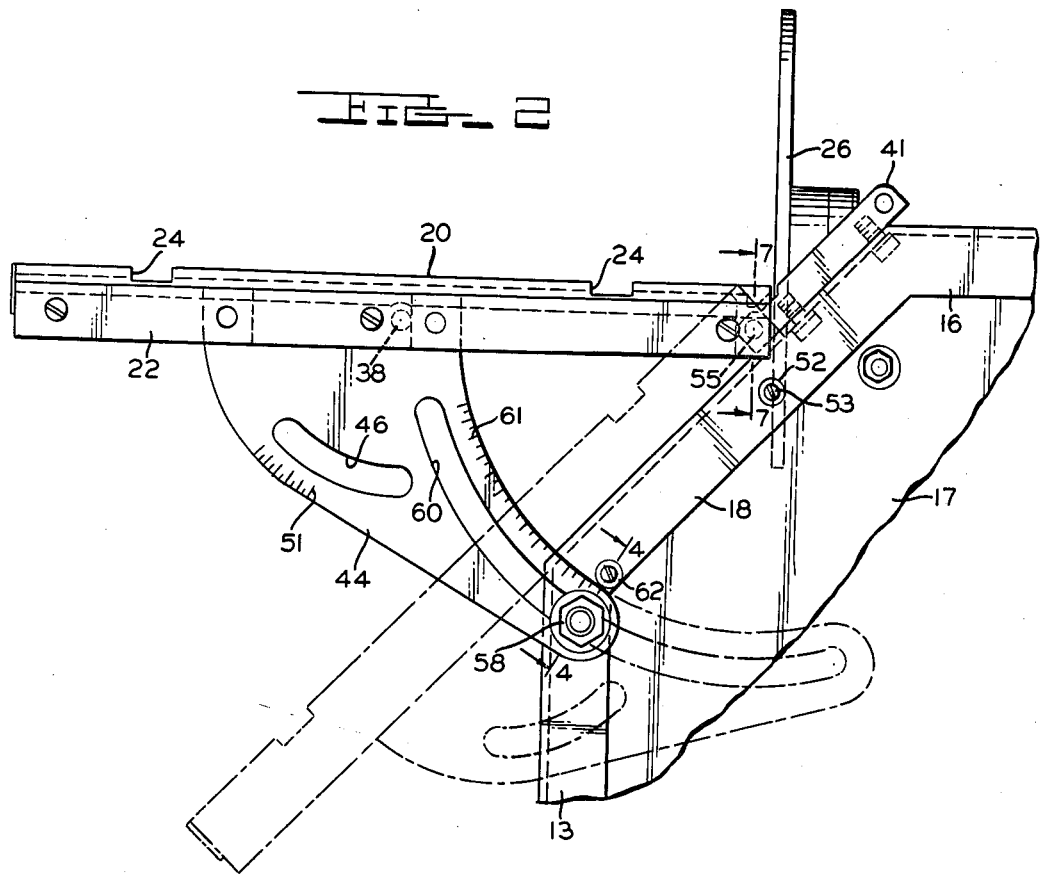

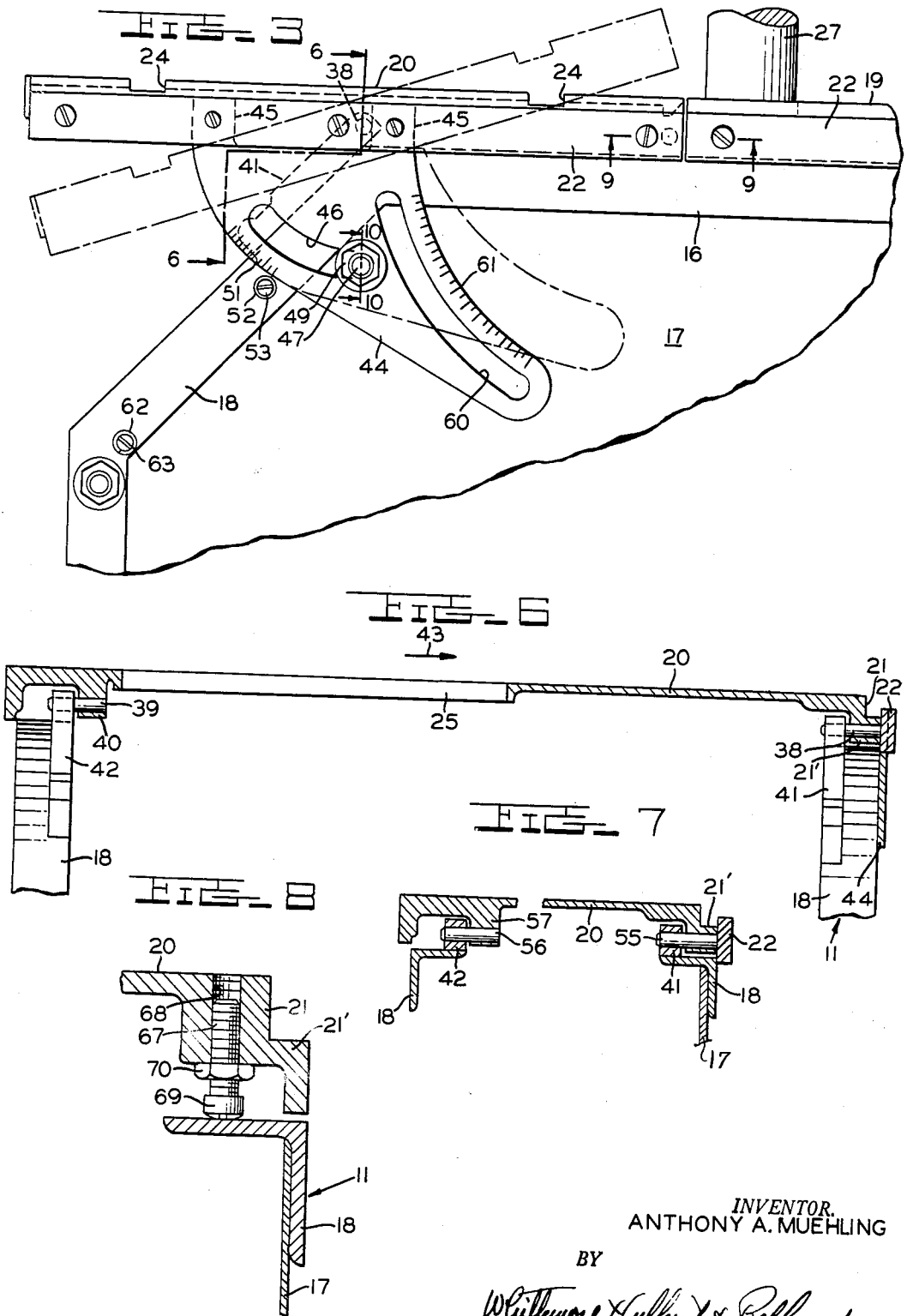

United States Patent Office 2,728,363
Patented Dec. 27, 1955

2,728,363

ADJUSTABLE TABLE STRUCTURE FOR MACHINE TOOLS

Anthony A. Muehling, Detroit, Mich.

Application June 1, 1954, Serial No. 433,714

2 Claims. (Cl. 143—132)

This invention relates generally to machine tools and refers more particularly to an improved table structure for machine tools.

It is an object of this invention to provide a machine tool having a table structure comprising a removable supporting plate selectively pivotally mounted on the machine frame at different elevations for tilting movement at each elevation from a horizontal position to different predetermined angular positions relative to the machine frame and having releasable means for holding the plate in the aforesaid positions relative to the machine frame. This construction is especially advantageous for use in connection with machine tools of the type capable of being converted to various different types of equipment such, for example, as drill presses, rotary saws, sanders, and lathes of different types and capacity. In accordance with the present invention, the plate renders it possible to support a work piece at different elevations and at various angles relative to the tool so that a multitude of different operations may be performed on the work piece.

The foregoing as well as other objects will be made more apparent as this description proceeds especially when considered in connection with the accompanying drawings, wherein:

Figure 1 is a perspective view of a machine tool embodying an adjustable table structure forming the subject matter of this invention;

Figure 2 is a fragmentary side elevational view of the table structure shown in Figure 1;

Figure 3 is a side elevational view similar to Figure 2 and showing the table in a different adjusted position;

Figure 4 (sheet 2) is a sectional view taken on the line 4—4 of Figure 2;

Figure 5 is a fragmentary side elevational view partly in section of a portion of the table structure;

Figure 6 (sheet 3) is a sectional view taken on the lines 6—6 of Figure 3;

Figure 7 is a sectional view taken on the line 7—7 of Figure 2;

Figure 8 is a sectional view taken on the line 8—8 of Figure 5;

Figure 9 (sheet 1) is a sectional view taken on the line 9—9 of Figure 3; and

Figure 10 is a sectional view taken on the line 10—10 of Figure 3.

Figure 1 of the drawings illustrates a typical machine tool in connection with which the present invention may be advantageously used and this tool is indicated generally by the reference character 10. Briefly, the machine tool 10 comprises a frame structure 11 in the form of a table having laterally spaced upright angle bars 12 at the rear and having correspondingly spaced upright angle bars 13 at the front thereof. The angle bars cooperate with one another to provide legs for supporting the table and are connected together in proper spaced relationship at the bottom by a platform 14. The upright members 12 and 13 at each side of the table are connected together intermediate the ends thereof by a cross brace 15 and are connected together at the top by a rail 16. Suitable panels 17 may be and preferably are secured to the inner surfaces of the cross braces 15 and rails 16. The opposite side rails 16 at the top of the frame structure terminate at their front ends in downwardly inclined sections 18 and the lower ends of the sections 18 are suitably secured to the upper ends of the members 13.

Seated on the rails 16 at the rear end of the frame structure 11 and secured in any suitable manner (not shown) to the frame structure is a top section in the form of a plate 19. The front edge of the plate 19 terminates short of the upper ends of the inclined rail sections 18 to enable supporting a second plate 20 on the rails 16 at the front edge of the plate 19, as shown in Figure 3 of the drawings. In this latter position of the two plates, the rear edge of the plate 20 is located in juxtaposition to the front edge of the plate 19 and the top surfaces of both plates lie in a common horizontal plane to provide an extended supporting surface. Both plates have depending flanges at opposite sides thereof and the flanges 21 at one side are formed with laterally outwardly extending projections 21'. See Figs. 6 to 8. The projections 21' are spaced below the top surfaces of the respective plates and the bars 22 are secured to the projections to provide longitudinally extending guides (see Fig. 9) for slidably supporting either a tool holder or a fence of the type indicated by the reference character 23 in Figure 1 of the drawings. Also the top surface of the plate 20 is provided with suitable grooves 24 at spaced points for positioning tool holders or work clamps relative to the plate 20. In addition the plate 20 may be slotted as at 25 to receive a rotary saw or a sanding disc of the type indicated generally by the reference character 26 in Figures 2 and 5 of the drawings.

The front edge of the plate 19 has a forwardly opening recess 26' intermediate opposite side edges thereof to provide clearance for a power head supporting tube or boom 27 when the latter is located in an upright position relative to the plate 19. The boom and mounting therefor forms the subject matter of my copending application, Serial No. 419,339, filed March 29, 1954, and, hence, are not shown in detail herein. For the present illustration, it will suffice to point out that the boom 27 is supported by a bracket 28 for sliding movement in the direction of its axis and for rotation about its axis. The bracket 28 is suitably pivotally mounted on the plate 19 at the underside of the latter in a manner to enable swinging the boom to horizontal, vertical and intermediate angular positions, depending on the type of machine tool required. A clamping device 29 is provided for holding the boom against sliding and rotative movements relative to the bracket 28, and a suitable latch mechanism 30 is provided for holding the boom in its various angular positions with respect to the plate 19. Both the clamping device 29 and the latch mechanism 30 are accessible for convenient manipulation from a position at one side of the frame structure.

A power head 31 is mounted on the front end of the boom 27. The power head 31 comprises a frame 32, a spindle 33 and a motor 34. The frame 32 is suitably clamped to the boom 27 and the drive shaft of the motor 34 is connected to the spindle 33 by a belt 35. The spindle 33 is journaled in the frame 32 with its axis extending parallel to the axis of the boom 27 and is rotated by the belt 35. In addition, the spindle 33 may be fed in the direction of its axis relative to the frame 32 by manipulating the handle 36 mounted on the frame 32 and operatively connected to the spindle. The rear end of the spindle has provision for securing a tool thereto and in Figure 1 of the drawings a grooving tool 37 is shown as secured to the spindle for operation by the latter.

The above construction is such that when the boom 27 is in its horizontal position it extends between the side panels 17 below the plate 19 and also extends below the plate 20 when the latter is in the position thereof shown in Figure 3 of the drawings. The plate 20 is removably supported by the frame structure and is detached from the frame structure to enable swinging movement of the boom 27 between its vertical and horizontal positions. In this connection, attention is directed to Figure 6 of the drawings wherein it will be noted that a pivot pin 38 is supported by the depending flange 21 intermediate the ends of the plate 20 and projects laterally inwardly from the flange 21. A second pivot pin 39 is mounted in a boss 40 depending from the plate 20 adjacent the side of the latter opposite the flange 21. The pivot pin 39 is in axial alignment with the pivot pin 38 and projects laterally outwardly from the boss 40. The inner projecting end of the pivot pin 38 and the outer projecting end of the pivot pin 39 are respectively journalled in bores formed in the upper ends of a pair of bars 41 and 42. The bars 41 and 42 are respectively secured to the top surfaces of the rail sections 18 at opposite sides of the frame structure. The upper ends of the bars 41 and 42 containing the bores for the pivot pins project a sufficient distance above the top surfaces of the rails 16 to enable locating the plate 20 in the horizontal position thereof shown in Figure 3 of the drawings.

It follows from the above that the plate 20 may be tilted about the axes of the pivot pins 38 and 39 from its horizontal position shown by the full lines in Figure 3 of the drawings to different angular positions, one of which is indicated by the broken lines in Figure 3 of the drawings. Also, it will be noted from Figure 6 of the drawings that the plate 20 may be readily removed from the frame structure 11 by merely shifting the plate 20 in the direction of the arrow 43 sufficiently to release the pivot pins 38 and 39 from the respective bores in the bars 41 and 42. Attachment of the plate 20 may be just as easily accomplished by merely aligning the pivot pins 38 and 39 with the bores in the respective bars 41 and 42, and thereafter shifting the plate in a direction opposite the direction of the arrow 43 in Figure 6.

In order to hold the plate 20 in any one of its several adjusted positions with respect to the frame structure 11, a plate 44 is provided at the side of the plate 20 adjacent the flange 21. The plate 44 extends vertically in overlying relationship to the adjacent panel 17 on the frame structure and the upper end of the plate 44 is fashioned with a pair of upstanding ears 45 as shown in Figure 3 of the drawings. The ears 45 are secured to the projection 21' on the plate 20 and the bar 22 is recessed (Figure 6) to provide clearance for the ears 45. The plate 44 is also fashioned with an arcuate slot 46 which is concentrically arranged with respect to the aligned axes of the pivot pins 38 and 39. As shown in Figure 10 of the drawings, a stud 47 projects through the slot 46 and the inner end thereof is threadably engaged in a bushing 48 extending through an opening formed in the panel 17. The bushing 48 is welded in place and, hence, is fixed against movement relative to the frame structure. A clamping nut 49 is threadably mounted on the outer end of the stud and a washer 50 is positioned on the stud 47 between the nut 49 and the plate 44. The arrangement is such that tightening the nut 49 clamps the plate 44 against the adjacent side of the upright frame member 13 and holds the plate 20 in a fixed position relative to the frame structure 11. Of course, loosening the nut 49 releases the plate 44 and enables the plate 20 to be tilted relative to the frame structure 11. In the present instance, suitable graduations 51 indicating degrees of angular movement of the plate 20 are applied to the plate 44 at the bottom side of the slot 46 and these graduations successively register with a reference line scribed on a washer 52 secured to the frame structure 11 adjacent the plate 44 by a screw 53. Thus, it is a simple matter to adjust the plate 20 to predetermined angular positions relative to the frame structure.

As shown in Figure 2 of the drawings, the plate 20 may also be supported in a horizontal position at an elevation lower than the position shown by the full lines in Figure 3 of the drawings. For this purpose the lower ends of the bars 41 and 42 have aligned bores for respectively receiving pins 54 and 55 fixed on the plate 20 adjacent the rear end thereof. As shown in Figure 7 of the drawings, the pivot pin 55 has the outer end anchored in the projection portion 21' on the depending flange 21 of the plate 20 and has the inner end extending into the bore formed in the lower end of the bar 41. The pivot pin 56 has the inner end anchored in a lug 57 depending from the table plate 20 and has the outer end extending through the bore formed in the lower end of the bar 42. The axes of the pivot pins 55 and 56 are aligned and are parallel to the pivot pins 38 and 39 supported on the plate 20 intermediate the ends of the latter. Also, the pins 55 and 56 are arranged to permit the plate 20 to be attached to and removed from the frame structure 11 in the same manner previously described in connection with the pivot pins 38 and 39. Thus, the plate 20 may be readily and selectively mounted in the two positions shown in Figures 2 and 3 of the drawings.

When the plate 20 is supported at the lower elevation shown in Figure 2, it may be readily swung about the aligned axes of the pivot pins 55 and 56 between the horizontal position shown by the full lines in Figure 2 to the angular or broken line position shown in this figure. The plate 20 is selectively clamped in either of the two positions aforesaid as well as in any desired intermediate angular position by a clamping nut 58. As shown in Figure 4 of the drawings, the nut 58 is threadably mounted on the outer end of a stud 59 which extends inwardly through a slot 60 formed in the plate 44. The slot 60 is concentrically arranged with respect to the aligned axes of the pins 55 and 56 to permit unobstructed tilting movement of the plate 20 about the latter pins, and graduations 61 are applied to the plate 44 in a position to successively register with a reference line on a washer 62. The washer 62 is adjustably fixed to the adjacent upright member 13 by a screw and nut assembly 63. The graduations 61 enable readily tilting the plate 20 to predetermined angular positions between the two positions shown in Figure 2 of the drawings.

The inner end of the stud 59 is threadably engaged in a bushing 64 extending through aligned openings formed in the upright member 13 and panel 17 adjacent the plate 44. The bushing is welded in place and, hence, is held against turning movement relative to the frame structure 11. A washer 65 is mounted on the stud 59 between the nut 58 and plate 44 so that tightening the nut 58 clamps the washer 65 against the plate 44 to hold the plate 20 in fixed relationship to the frame structure 11. It is apparent from the foregoing that loosening the nut 58 permits the plate 20 to be adjusted to predetermined angular positions between the two positions indicated in Figure 2 of the drawings. Thus, the plate 20 may be adjusted to predetermined angular positions when supported at either end of the bars 41 and 42. This is highly advantageous in a universal machine tool of the general type illustrated in that it enables supporting the work in various different predetermined positions relative to the tool. For example, in Figure 1 of the drawing a work piece 66 is held by the fence 23 on the plate 20 in the position required to cut a rabbeted portion in one edge of the work piece by the grooving tool 37. This is just one of a multitude of operations that may be performed by the machine tool selected herein for the purpose of illustration, and the adjustability of the plate 20 contributes materially to the versatility of the machine.

Provision is made herein for accurately locating the plate 20 in the horizontal position shown by the full lines in Figure 3 and in the extreme angular position shown by the broken lines in Figures 2 and 5 of the drawings. As shown in Figure 8 of the drawings, a pair of set screws 67 are respectively threaded in vertical bores 68 formed in the plate 20 at opposite sides of the plate and adjacent the rear end of the latter. The lower ends of the screws 67 are formed with heads 69 which respectively engage adjacent surfaces of the frame structure 11 at opposite sides of the latter. In the horizontal or full line position of the plate 20 shown in Figure 3, the heads 69 respectively engage the rails 16 and in the extreme angular position shown by the broken lines in Figures 2 and 5, the heads 69 respectively engage the inclined sections 18 of the rails 16. It is apparent from the above that the plate 20 may be accurately located in either of the two positions aforesaid by merely adjusting the screws 67. Suitable lock nuts 70 are respectively threaded on the screws 67 in positions to engage the underside of the plate 20 and securely hold the screws 67 in their adjusted positions.

It will also be noted from the foregoing that the studs 47 and 59 are removable from their respective bushings 48 and 64. The purpose of this arrangement is to enable the plate 20 to be removed from the frame structure 11 when desired and to be readily transferred from one position to the other on the frame structure. Attention is further called to the fact that the stud 59, bushing 64, and nut 58 are identical to the stud 47, bushing 48 and nut 49, respectively. Since the studs are removably supported by their respective bushings, it is possible to use the same stud and nut assembly for selectively clamping the plate 44 to the frame structure in both elevated positions of the plate 20. Hence once of the aforesaid stud and nut assemblies may be eliminated, if desired.

What I claim as my invention is:

1. A machine tool comprising frame structure having laterally spaced rails at the top and having portions respectively inclined downwardly from the front ends of the rails, a top plate bridging the rails at the rear of the frame structure and secured to the latter, a second plate selectively supported by the rails in advance of the top plate to form a continuation of the latter or by the inclined portions of the frame structure at a lower elevation than said top plate, means pivotally mounting the second plate in either of the locations aforesaid for tilting movement from a horizontal position to angular positions relative to the frame structure.

2. A machine tool comprising frame structure having laterally spaced substantially horizontally extending rails at the top and having portions respectively inclined downwardly from the front ends of the rails, a top plate bridging the rails adjacent the rear end of the frame structure and secured to the latter, a second plate selectively supported by the rails in advance of the top plate to form a continuation of the latter or by the inclined portions of the frame structure at a lower elevation than the top plate, a pair of vertically spaced journals at each side of the frame structure adjacent the front ends of the horizontal rails and having the axes thereof located in a common plane substantially parallel to the plane of the downwardly inclined portions, the uppermost journals being spaced above the tops of the rails and the lowermost journals being spaced below the rails, a pair of aligned pivot pins mounted on the plate intermediate the ends thereof and respectively removably engageable with the top journals, a second pair of pivot pins mounted on the plate adjacent the rear end of the latter and respectively removably engageable with the bottom journals, and cooperating means on the plate and frame structure for holding the plate in predetermined adjusted positions relative to the frame structure.

References Cited in the file of this patent

UNITED STATES PATENTS

| | | |
|---|---|---|
| 250,712 | Colburn | Dec. 13, 1881 |
| 275,139 | Carey | Apr. 3, 1883 |
| 475,553 | Greaves | May 24, 1892 |
| 720,912 | Gorton | Feb. 17, 1903 |
| 1,336,799 | Vaughan | Apr. 13, 1920 |
| 2,016,528 | Wilson | Oct. 8, 1935 |